United States Patent
Wang

(10) Patent No.: US 12,388,723 B2
(45) Date of Patent: Aug. 12, 2025

(54) SERVICE PROVIDING METHOD AND APPARATUS

(71) Applicant: Huawei Cloud Computing Technologies Co., Ltd., Guizhou (CN)

(72) Inventor: Xianlei Wang, Beijing (CN)

(73) Assignee: Huawei Cloud Computing Technologies Co., Ltd., Gui'an (CN)

( * ) Notice: Subject to any disclaimer, the term of this patent is extended or adjusted under 35 U.S.C. 154(b) by 0 days.

(21) Appl. No.: 18/491,787

(22) Filed: Oct. 22, 2023

(65) Prior Publication Data

US 2024/0048460 A1 Feb. 8, 2024

Related U.S. Application Data

(63) Continuation of application No. PCT/CN2022/086548, filed on Apr. 13, 2022.

(30) Foreign Application Priority Data

Apr. 27, 2021 (CN) .......................... 202110459741.6

(51) Int. Cl.
| | | |
|---|---|---|
| H04L 67/1008 | (2022.01) | |
| G06F 9/50 | (2006.01) | |
| H04L 41/50 | (2022.01) | |
| H04L 67/60 | (2022.01) | |
| G06F 9/455 | (2018.01) | |
| H04L 65/80 | (2022.01) | |

(52) U.S. Cl.
CPC .......... *H04L 41/50* (2013.01); *H04L 67/1008* (2013.01)

(58) Field of Classification Search
None
See application file for complete search history.

(56) References Cited

U.S. PATENT DOCUMENTS

| | | | |
|---|---|---|---|
| 9,454,605 B1 * | 9/2016 | Mello | H04L 9/3247 |
| 9,645,847 B1 * | 5/2017 | Roth | G06F 9/461 |
| 10,778,757 B1 * | 9/2020 | Uppal | H04L 67/101 |
| 10,880,232 B1 * | 12/2020 | Goodman | H04L 47/822 |
| 2013/0254778 A1 | 9/2013 | Lakshmanan et al. | |
| 2019/0036793 A1 * | 1/2019 | Ma | H04L 67/51 |
| 2020/0379968 A1 * | 12/2020 | Mammen | H04L 45/28 |
| 2021/0352137 A1 * | 11/2021 | Fahlbusch | G06F 9/5077 |

FOREIGN PATENT DOCUMENTS

| | | |
|---|---|---|
| CN | 108829507 A | 11/2018 |
| CN | 111934918 A | 11/2020 |
| CN | 111935110 A | 11/2020 |

OTHER PUBLICATIONS

Anonymous: "Cloud Container Engine User Guide Huawei", Feb. 28, 2021 (Feb. 28, 2021), pp. 1-477, XP093174490.
Anonymous: "Amazon EKS User Guide", Dec. 10, 2020 (Dec. 10, 2020), pp. 1-400, XP093175109.

* cited by examiner

*Primary Examiner* — Kamal M Hossain

(57) ABSTRACT

In a service providing method, a service providing apparatus receives a first service request from a tenant, and the first service request includes an identifier of a tenant. The service providing apparatus adds a first service instance to a target serving cell associated with the tenant, where the first service instance is for processing the first service request.

14 Claims, 7 Drawing Sheets

```
{
  "serving cell ID":{
          "service instance number":[algorithm identifier, weight, state],
          "service instance number":[algorithm identifier, weight, state],
          ...
          "service instance number":[algorithm identifier, weight, state],
  },
  "serving cell ID":{
          "service instance number":[algorithm identifier, weight, state],
          "service instance number":[algorithm identifier, weight, state],
          ...
          "service instance number":[algorithm identifier, weight, state],
  },
  ...
}
```

FIG. 4

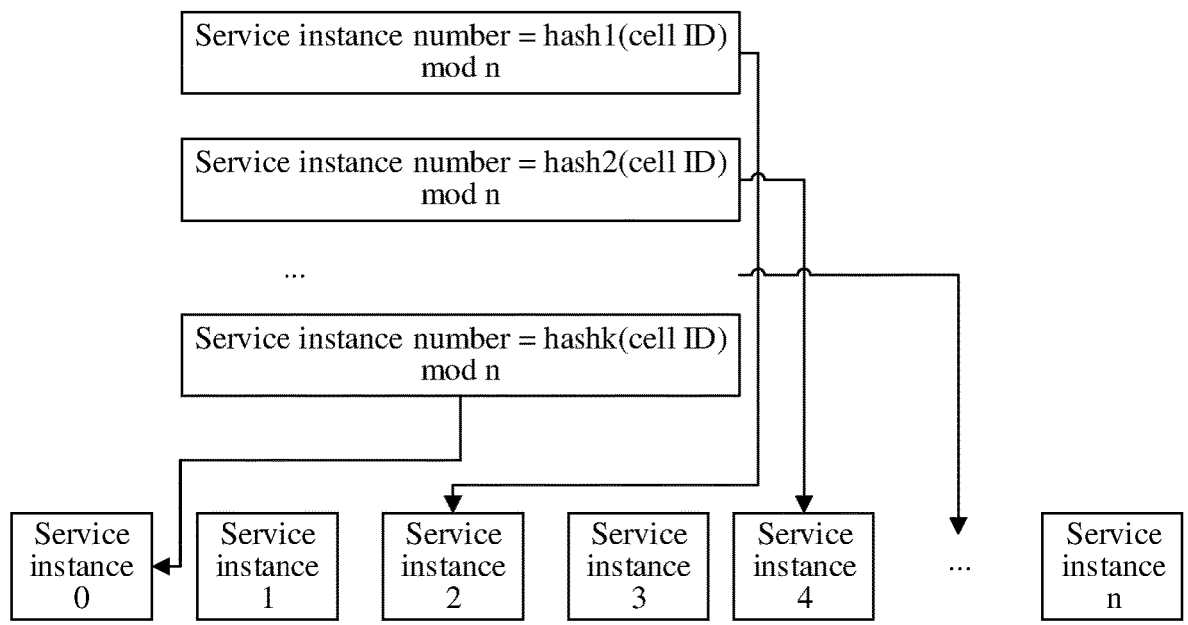

FIG. 5

SERVICE PROVIDING METHOD AND APPARATUS

CROSS-REFERENCE TO RELATED APPLICATIONS

This application is a continuation of International Application PCT/CN2022/086548, filed on Apr. 13, 2022, which claims priority to Chinese Patent Application 202110459741.6, filed on Apr. 27, 2021. The disclosures of the aforementioned applications are hereby incorporated by reference in their entirety.

TECHNICAL FIELD

This application relates to the field of computer technologies, and specifically, to a service providing method and apparatus.

BACKGROUND

A business or service usually needs a plurality of service instances (the service instances may include a virtual machine, a server, a back-end node, a cloud service instance, a microservice instance, and the like) to provide resources such as computing, storage, and networks.

Because there are usually a plurality of service instances, if a fault is triggered when a service request of one tenant is processed in a service instance, an entire system that provides a business or provides a service may crash. For example, as shown in FIG. 1, a service request of a tenant may be scheduled to one back-end service instance for processing. If a fault occurs when a service request of a tenant A is processed by a service instance 1 (for example, the request of the tenant A triggers a specific bug), the service instance 1 may crash or break down. Because the service request of the tenant A has not been successfully processed, the service request may be scheduled to a service instance 2 for processing, causing the service instance 2 to crash or break down. The request is further processed by another service instance. As a result, a fault may also occur on the another service instance, affecting requests of all other tenants running in a system and causing the entire system to be unavailable.

How to resolve the foregoing problem is a hot topic being studied by persons skilled in the art.

SUMMARY

This application provides a service providing method and apparatus, to effectively reduce a blast radius of a system and improve system stability.

According to a first aspect, an embodiment of this application provides a service providing method, including:
receiving a first service request, where the first service request includes an identifier of a tenant; and
adding a first service instance to a target serving cell associated with the tenant, where the first service instance is for processing the first service request.

In this embodiment of this application, a service instance may be flexibly added based on a request of a tenant, thereby improving flexibility of a serving cell. Further, a service request of the tenant is allocated to a serving cell associated with the tenant for processing. If the service request of the tenant triggers a fault, a service instance in a serving cell that is not associated with the tenant is not affected, thereby reducing a fault radius and improving system stability.

In a possible implementation of the first aspect, the method includes:
creating the target serving cell for the first service request.

In another possible implementation of the first aspect, the method includes:
selecting, from a plurality of serving cells, one serving cell as the target serving cell.

In another possible implementation of the first aspect, the method includes:
selecting, from a plurality of serving cells, one serving cell that is not associated with another tenant as the target serving cell.

The foregoing describes a case of determining a serving cell. Because the target serving cell is not associated with another tenant, a case in which another serving cell is unavailable due to a fault caused by one tenant is avoided, thereby improving system availability.

In another possible implementation of the first aspect, the method includes:
receiving a second service request, where the second service request includes the identifier of the tenant; and
selecting a second service instance from a plurality of service instances in the target serving cell according to a load balancing principle, where the second service instance is for processing the second service request.

According to the foregoing descriptions, when a service request is scheduled, the service request may be scheduled to a light-load service instance (for example, the second service instance) according to a load balancing principle, to implement load balancing between service instances as much as possible, thereby increasing a throughput and improving system flexibility and availability.

In another possible implementation of the first aspect, after the adding a first service instance to a target serving cell associated with the tenant, the method includes:
moving the target first service instance out of the target serving cell.

Because the service instance in the serving cell changes dynamically, in a case in which current service load is low, first service processing is completed, a system is scaled in, or the like, the first service instance may be moved out of the target serving cell. Optionally, the moved service instance may be subsequently added to another serving cell to perform other service processing, to improve flexibility and availability of the system.

In another possible implementation of the first aspect, the method includes:
when service load of the target serving cell is less than a threshold, moving one or more service instances out of the target serving cell.

In this way, a quantity of service instances in a serving cell may be dynamically controlled based on a change of service load, thereby improving utilization of service instances and improving user experience. Further, the moved service instance may be added to a serving cell with high service load, so that overall service processing efficiency of a system can be improved.

In another possible implementation of the first aspect, the target serving cell belongs to an availability zone AZ.

In another possible implementation of the first aspect, different serving cells belong to different AZs, or different serving cells belong to a same AZ.

In another possible implementation of the first aspect, different serving cells belong to different fault domains.

In this way, a fault occurred on one serving cell does not or does not easily cause a fault occurred on another serving cell, thereby reducing a fault radius, avoiding an explosive increase of faults, and improving system stability.

In another possible implementation of the first aspect, the first service instance corresponds to a state identifier, and the state identifier represents a quantity of serving cells to which the first service instance belongs or represents whether the first service instance is abnormal.

The state identifier is used to determine a current state of a service instance, to facilitate management of a plurality of service instances and improve service quality. For example, when a service instance added to a serving cell is selected, filtering may be performed more quickly, thereby improving efficiency.

In another possible implementation of the first aspect, the method further includes:
  preferentially selecting, from available service instances, a service instance that is not added to another serving cell as the first service instance; or
  preferentially selecting, from available service instances, a service instance that belongs to a small quantity of serving cells as the first service instance.

In the foregoing manner of determining the service instance, a case in which service instances in different serving cells overlap can be reduced as much as possible. One service instance can provide services for a smaller quantity of serving cells as possible, so that availability of a plurality of service instances in a system is improved, and a case in which a single service instance is overloaded is avoided or reduced. In addition, impact of a fault in one serving cell on another serving cell can be reduced, thereby improving system stability.

In another possible implementation of the first aspect, the method further includes:
  determining M to-be-selected service instances from available service instances, where M is an integer greater than 1; and
  using, as the first service instance, a service instance that is in the M to-be-selected service instances and that belongs to a smallest quantity of serving cells.

In another possible implementation of the first aspect, the determining M to-be-selected service instances from available service instances includes:
  determining a to-be-selected service instance from available service instances based on a selection algorithm.

Optionally, the selection algorithm may include one or more of a hash algorithm, a random algorithm, and the like. Further, optionally, the selection algorithm may further include one or more parameters of an identifier of a first serving cell, a quantity of service instances included in the first serving cell, a quantity of available service instances, and the like.

In another possible implementation of the first aspect, the method further includes:
  receiving first indication information sent by a terminal device, where the first indication information is obtained based on user input; and
  determining, based on the first indication information, a quantity of available service instances or a quantity of service instances included in the first serving cell.

It can be seen that, a parameter related to a serving cell in the system may be determined based on a requirement of a user, thereby improving user experience.

According to a second aspect, an embodiment of this application provides a service providing method, including:
  receiving a quantity of available service instances or a quantity of service instances included in a first serving cell that is output by a user;
  obtaining first indication information based on the quantity of available service instances or the quantity of service instances included in the first serving cell; and
  sending the first indication information to a service providing apparatus.

According to a third aspect, an embodiment of this application provides a service providing apparatus. The apparatus includes:
  a communication unit, configured to receive a first service request, where the first service request includes an identifier of a tenant; and
  a processing unit, configured to add a first service instance to a target serving cell associated with the tenant, where the first service instance is for processing the first service request.

In a possible implementation of the third aspect, the processing unit is further configured to:
  create the target serving cell for the first service request.

In another possible implementation of the third aspect, the processing unit is further configured to:
  select, from a plurality of serving cells, one serving cell as the target serving cell.

In another possible implementation of the third aspect, the processing unit is further configured to:
  select, from a plurality of serving cells, one serving cell that is not associated with another tenant as the target serving cell.

In another possible implementation of the third aspect, the communication unit is further configured to receive a second service request, and the second service request includes the identifier of the tenant.

The processing unit is further configured to select a second service instance from a plurality of service instances in the target serving cell according to a load balancing principle, where the second service instance is for processing the second service request.

In another possible implementation of the third aspect, the processing unit is further configured to:
  move the first service instance out of the target serving cell.

In another possible implementation of the third aspect, the processing unit is further configured to:
  when service load of the target serving cell is less than a threshold, move one or more service instances out of the target serving cell.

In another possible implementation of the third aspect, the target serving cell belongs to an availability zone AZ.

In another possible implementation of the third aspect, different serving cells belong to different AZs, or different serving cells belong to a same AZ.

In another possible implementation of the third aspect, different serving cells belong to different fault domains.

In another possible implementation of the third aspect, the first service instance corresponds to a state identifier, and the state identifier represents a quantity of serving cells to which the first service instance belongs or represents whether the first service instance is abnormal.

In another possible implementation of the third aspect, the processing unit is further configured to:
  preferentially select, from available service instances, a service instance that is not added to another serving cell as the first service instance; or
  preferentially select, from available service instances, a service instance that belongs to a small quantity of serving cells as the first service instance.

In another possible implementation of the third aspect, the processing unit is further configured to:

determine M to-be-selected service instances from available service instances, where M is an integer greater than 1; and determine the first service instance from the M to-be-selected service instances, where the first service instance is a service instance that is in the N to-be-selected service instances and that belongs to a smallest quantity of serving cells.

In another possible implementation of the third aspect, the processing unit is further configured to:

determine a to-be-selected service instance from available service instances based on a selection algorithm.

Optionally, the selection algorithm may include one or more of a hash algorithm, a random algorithm, and the like. Further, optionally, the selection algorithm may further include one or more parameters of an identifier of a first serving cell, a quantity of service instances included in the first serving cell, a quantity of available service instances, and the like.

In another possible implementation of the third aspect, the communication unit is further configured to receive first indication information sent by a terminal device, and the first indication information is obtained based on user input.

The processing unit is further configured to determine, based on the first indication information, a quantity of available service instances or a quantity of service instances included in the first serving cell.

According to a fourth aspect, an embodiment of this application provides a terminal device, including:

an input unit, configured to receive a quantity of available service instances or a quantity of service instances included in a first serving cell that is output by a user;

a processing unit, configured to obtain first indication information based on the quantity of available service instances or the quantity of service instances included in the first serving cell; and a communication unit, configured to send the first indication information to a service providing apparatus.

According to a fifth aspect, an embodiment of this application provides a service providing apparatus, including a processor and a memory. The processor is configured to execute computer instructions stored in the memory, so that the service providing apparatus implements the method described in any one of the implementations of the first aspect.

In a process of implementing the foregoing method, a process of sending information (for example, the first information) and/or receiving information in the foregoing method may be understood as a process of outputting information by a processor and/or a process of receiving input information by a processor. When outputting information, the processor may output the information to a transceiver (or a communication interface or a sending module), so that the transceiver transmits the information. After the information is output by the processor, other processing may be further required before the information arrives at the transceiver. Similarly, when the processor receives the input information, the transceiver (or the communication interface or the sending module) receives the information, and inputs the information into the processor. Further, after the transceiver receives the information, other processing may need to be performed on the information before the information is input into the processor.

According to the foregoing principle, for example, sending information mentioned in the foregoing method may be understood as outputting information by a processor. For another example, receiving information may be understood as receiving input information by a processor.

Optionally, unless otherwise specified, or if operations such as transmitting, sending, and receiving related to the processor do not contradict an actual function or internal logic of the operations in related descriptions, all the operations may be more generally understood as operations such as outputting, receiving, and inputting of the processor, instead of operations such as transmitting, sending, and receiving directly performed by a radio frequency circuit and/or an antenna.

Optionally, in a process of implementation, the processor may be a processor specially configured to perform the methods, or may be a processor that performs the methods by executing computer instructions in a memory, for example, a general-purpose processor. The memory may be a non-transitory (non-transitory) memory, for example, a read-only memory (ROM). The memory and the processor may be integrated on a same chip, or may be separately disposed on different chips. A type of the memory and a manner in which the memory and the processor are disposed are not limited in embodiments of this application.

In a possible implementation, at least one memory is located outside the communication apparatus.

In another possible implementation, at least one memory is located in the communication apparatus.

In another possible implementation, a part of the at least one memory is located in the communication apparatus, and the other part of the at least one memory is located outside the communication apparatus.

In this application, the processor and the memory may be alternatively integrated into one device, to be specific, the processor and the memory may be alternatively integrated together.

According to a sixth aspect, an embodiment of this application provides a terminal device, including a processor and a memory. The processor is configured to execute computer instructions stored in the memory, so that a service providing apparatus implements the method described in any one of the implementations of the second aspect.

According to a seventh aspect, an embodiment of this application provides a service system. A service providing system includes a service providing apparatus and a service instance. The service instance is for processing a service request. The service providing apparatus includes the apparatus described in any one of the implementations of the third aspect.

According to an eighth aspect, an embodiment of this application provides a service system. The service system includes a terminal device and a service providing system. The service providing apparatus includes the apparatus described in any one of the implementations of the third aspect. The terminal device includes the apparatus described in any one of the implementations of the fourth aspect.

According to a ninth aspect, an embodiment of this application further provides a chip system. The chip system includes at least one processor and a communication interface. The communication interface is configured to send and/or receive data. The at least one processor is configured to invoke computer instructions stored in at least one memory, and the chip system is enabled to implement the method described in any one of the implementations of the first aspect or the second aspect.

According to a tenth aspect, this application provides a computer-readable storage medium. The computer-readable storage medium stores computer instructions, and the computer instructions are executed by a processor to implement the method according to any one of the implementations of the first aspect or the second aspect.

According to an eleventh aspect, this application provides a computer program product. When the computer program product is read and executed by a computer, the method according to any one of the implementations of the first aspect or the second aspect is performed.

The solutions provided in the second aspect to the eleventh aspect are for implementing or cooperatively implementing the method provided in the first aspect. Therefore, for related beneficial effects, refer to the beneficial effects of the first aspect. Details are not described herein again.

BRIEF DESCRIPTION OF DRAWINGS

The following describes the accompanying drawings used in embodiments of this application.

FIG. 4 is a schematic diagram of information about a serving cell according to an embodiment of this application;

FIG. 5 is a schematic diagram of a service instance determining method according to an embodiment of this application;

DESCRIPTION OF EMBODIMENTS

The following describes embodiments of this application with reference to the accompanying drawings in embodiments of this application.

For ease of understanding, for example, the following provides some descriptions of concepts related to embodiments of this application for reference. Details are as follows.

1. Availability Zone (AZ)

An infrastructure in cloud computing includes a large quantity of physical servers and networks. To satisfy global requirements such as quick access and disaster recovery, the infrastructure in the cloud computing may be deployed in different geographical locations. A region (region) is large geographical space in the cloud computing, and is usually classified by using a province or a city as a unit. For example, in China, AWS has regions such as a Beijing region, a Ningxia region, and a Hong Kong region. Because regions are far away from each other, costs of directly connecting equipment rooms through optical fibers is high.

To satisfy requirements such as intra-city disaster recovery, a cloud computing service provider usually sets a plurality of equipment rooms in one region for mutual backup. Different equipment rooms in a same region are referred to as AZs. AZs are close to each other and can be flexibly deployed. Once a fault occurs, AZs can be quickly switched over without affecting user experience.

2. Global Server Load Balancing (GSLB)

A primary purpose of the global server load balancing (GSLB) is to schedule a request of a user to a nearest node (or region) on an entire network. The global server load balancing is usually applied in a system that includes a plurality of different physical region infrastructures.

Descriptions of the foregoing related concepts may be applied to the following embodiments.

Figure 1:
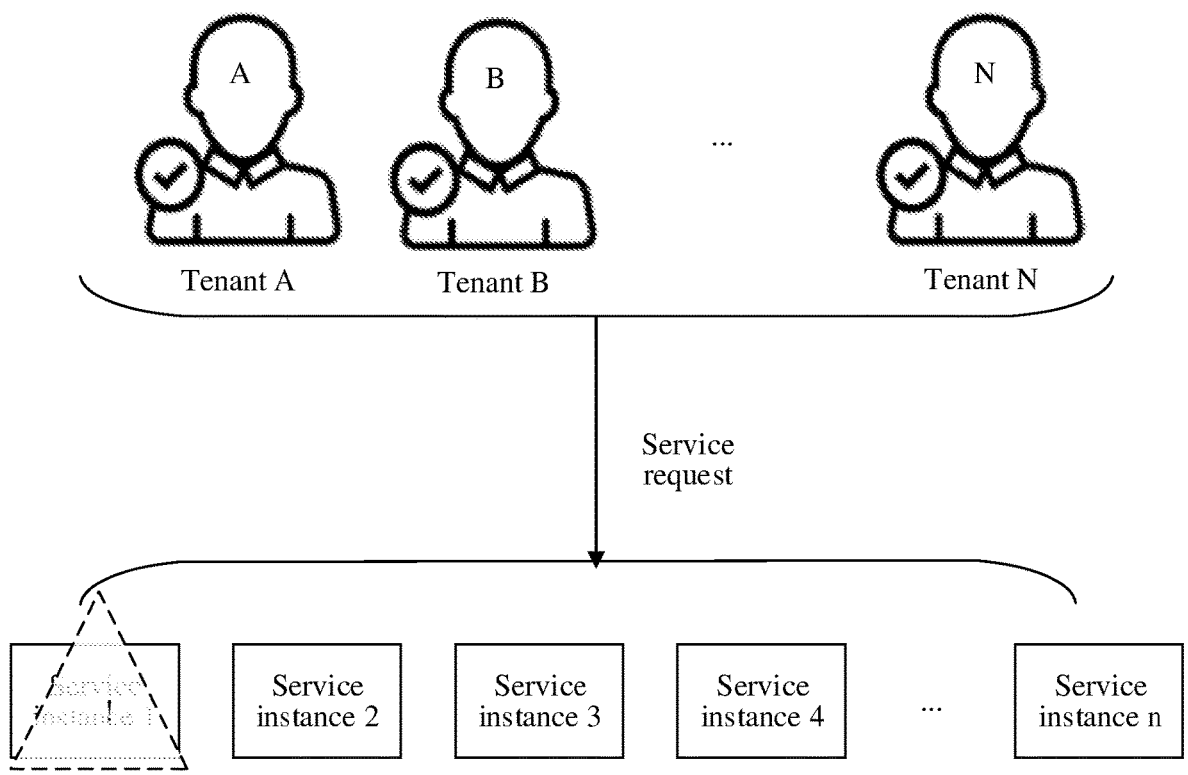
FIG. 1 is a schematic diagram of an architecture of a service system.
Figure 2:
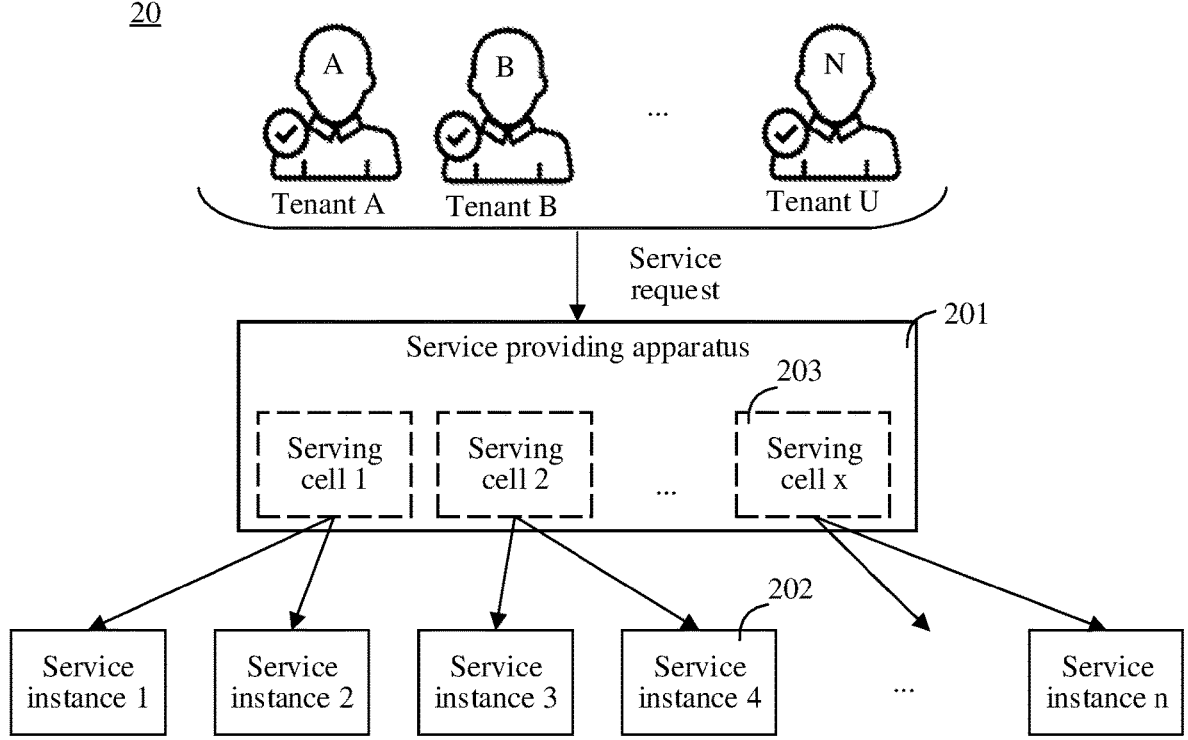
FIG. 2 is a schematic diagram of an architecture of a service system according to an embodiment of this application.

For ease of understanding embodiments of this application, the following first describes a possible service system on which embodiments of this application are based. FIG. 2 is a schematic diagram of an architecture of a possible service system 20 according to an embodiment of this application. The service system 20 may include a service providing apparatus 201 and a service instance 202.

The service instance 202 is a module that provides a service or completes a specific service. It should be noted that the service instance may be a service of software, for example, a cloud computing service instance, a microservice instance, or a network service instance. Alternatively, the service instance may be a service instance of hardware, for example, a processor or a memory. In some scenarios, the service instance may include an entity device, for example, a back-end node or a server, or include a virtual module, for example, a virtual machine or a container.

The service providing apparatus 201 is an apparatus with a data processing capability and a communication capability. The service providing apparatus 201 may schedule a service request of a tenant (for example, a tenant A or a tenant B) to a service instance, so that the tenant can use a service provided by the service instance. Optionally, the service providing apparatus 201 may include apparatuses such as a server, a mobile terminal, a host, a virtual machine, and a robot. It should be understood that, when the service providing apparatus 201 includes a server, the service providing apparatus may include one server, or may include a server cluster including a plurality of servers. Optionally, the service providing apparatus 201 may alternatively be a cloud platform, and may be deployed on a public cloud, a private cloud, or a hybrid cloud.

Optionally, the service providing apparatus may be deployed in a load balancing device.

In this application, the service instance 202 is added to a serving cell 203. For example, a serving cell 1 includes a service instance 1 and a service instance 2, and a serving cell 2 includes a service instance 3 and a service instance 4.

Further, a serving cell may be associated with a tenant, so that a service request of a specific tenant may be scheduled to a service instance in an associated serving cell. For example, the tenant A may be associated with the serving cell 1, and a service request from the tenant A may be scheduled to the service instance 1 or the service instance 2. Similarly, the tenant B may be associated with the serving cell 2, and a service request from the tenant B may be scheduled to the service instance 3 or the service instance 4. In this way, if a service instance fault is triggered by the service request of the tenant A, an entire system is not faulty, thereby reducing a blast radius, avoiding or reducing impact on another tenant, and improving system stability.

It should be understood that, in this application, a service instance in a serving cell may dynamically change. For example, if the tenant A is a new tenant, or no service instance is added to a serving cell associated with the tenant A, it may be dynamically determined that a service instance is added to the serving cell associated with the tenant A.

It should be noted that a quantity of service instances is not limited in this application. The tenant mentioned in this embodiment of this application may be an enterprise user, an organization user, or an individual user, or may be an object that can operate or invoke an input module in a computer, for example, computer instructions. For a definition of the tenant, refer to a definition in a conventional technology. This is not limited in this embodiment of this application.

Figure 3:
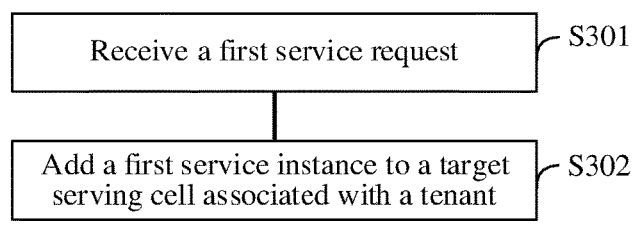
FIG. 3 is a schematic diagram of a service providing method according to an embodiment of this application.

FIG. 3 is a schematic flowchart of a service providing method according to an embodiment of this application. Further, the method may be implemented based on the framework shown in FIG. 2. The method includes at least the following steps.

Step S301: A service providing apparatus receives a first service request.

Specifically, the service providing apparatus is an apparatus with a communication capability and a data processing capability. The service providing apparatus may be an independent device, for example, a server or a host, or may be a module in the independent device, for example, a chip or an integrated circuit.

The first service request includes an identifier of a tenant. Optionally, the identifier of the tenant may be one or more of an identification (ID) of the tenant, a number of the tenant, an identifier of a device used by the tenant, or the like. In a possible design, the service providing apparatus may allocate a tenant ID to the tenant, and the tenant may subsequently request a service by using the tenant ID.

Optionally, the first service request may indicate that the tenant currently has a service request for processing, or indicate that the tenant needs to create a serving cell, or indicate that the tenant requests to add a service instance.

Step S302: The service providing apparatus adds a first service instance to a target serving cell associated with the tenant.

Specifically, the tenant is associated with a serving cell, and a request of the tenant may be scheduled to a service instance in the associated target serving cell for processing. Optionally, the service providing apparatus may first determine the target serving cell associated with the tenant. For example, the following three possible designs are cited in this application.

Design 1: The service providing apparatus may create the target serving cell for the service request. Optionally, after receiving the service request, the service providing apparatus may create the target serving cell in response to the service request. A service instance in the target serving cell may be used to process the service request.

For example, refer to Table 1. Table 1 is a possible information table of a serving cell provided in this embodiment of this application, and includes information such as an ID of the serving cell, a service instance included in the serving cell, and an associated tenant. The information table of the serving cell may be used to determine a serving cell associated with a tenant, or used to determine a service instance in a serving cell.

For example, if a tenant X is a new tenant, and a target serving cell associated with the tenant X is not created, the target serving cell (for example, an ID may be C000X) may be created when or after the first service request is received. Further, the service providing apparatus may establish an association relationship between the target serving cell and the tenant in the information table of the serving cell.

TABLE 1

Information table of serving cell

| Cell ID | Included service instance | Associated tenant |
|---|---|---|
| C0001 | Service instance 0, service instance 1 | A |
| C0002 | Service instance 3, service instance 4 | B |
| C0003 | Service instance 5 | C |
| . . . | . . . | . . . |
| C00X | First service instance | Tenant X |

It should be noted that the target serving cell may be configured to process only the first service request, or may be configured to subsequently process another service request of the tenant X.

Design 2: The service providing apparatus may select one serving cell from a plurality of serving cells as the target serving cell. Optionally, the plurality of serving cells may be predefined, pre-configured, or created after a last service request (for example, a service request of the tenant processed last time) arrives.

Further, the service providing apparatus may select one serving cell from the plurality of serving cells as the target serving cell based on the identifier of the tenant. For example, the service providing apparatus generates a serving cell ID based on the identifier of the tenant, and selects, from the plurality of serving cells based on the serving cell ID, a serving cell corresponding to the serving cell ID. For example, the serving cell ID satisfies the following formula:

$$cell\_ID = Base64(tenant\_ID)$$

cell_ID is a serving cell ID, Base64( ) is an example of mapping, and tenant_ID is an identifier of a tenant. It can be seen that an ID of a serving cell may be generated based on the tenant ID, to search for a corresponding target serving cell.

Design 3: The service providing apparatus selects, from a plurality of serving cells, one serving cell that is not associated with another tenant as the target serving cell.

For example, refer to Table 2. Table 2 is another possible information table of a serving cell provided in this embodiment of this application, and includes information such as an ID of the serving cell, a service instance included in the serving cell, and an associated tenant. A serving cell D0001 is associated with a tenant A, a serving cell D0002 is associated with a tenant B, . . . , and the like. When receiving a service request related to a tenant X, the service providing apparatus may select, from the plurality of serving cells, a serving cell D004 that is not associated with another tenant as a target serving cell.

TABLE 2

Information table of serving cell

| Cell ID | Included service instance | Associated tenant |
|---|---|---|
| D0001 | Service instance 0, service instance 1 | A |
| D0002 | Service instance 3, service instance 4 | B |
| D0003 | Service instance 5 | C |
| D0004 | — | — |
| . . . | . . . | . . . |

It should be understood that the foregoing Table 1 and Table 2 are intended to facilitate description of a correspondence between a serving cell and a service instance or between a serving cell and a tenant. In a process of specific implementation, the correspondence may alternatively be stored or transmitted in another format, for example, may be data in one or more of a JavaScript object notation (JavaScript Object Notation, JSON) format, a log format, a database format, and the like. The JSON format is used as an example. FIG. 4 is a schematic diagram of possible information about a serving cell according to an embodiment of this application. A lower layer of each serving cell ID (cell ID) includes information about a service instance included in the serving cell. The information about the service instance may specifically include one or more of a service instance number (for example, may be member1 or member2), a weight of the service instance, an algorithm identifier for determining the service instance, a state (or a state identifier) of the service instance, and the like.

It should be understood that there are usually a plurality of available service instances in a system, and one service instance may belong to one serving cell or may belong to a plurality of serving cells. Optionally, the service providing apparatus may preferentially select, from the plurality of available service instances, one service instance that is not added to another serving cell as the first service instance; and/or the service providing apparatus may preferentially select, from available service instances, a service instance that belongs to a small quantity of serving cells as the first service instance. For example, the following three designs are cited in this application.

Design 1: A service instance that belongs to a smallest quantity of serving cells is selected as the first service instance. If there are a plurality of service instances that belong to a smallest quantity of serving cells, one of the service instances may be randomly selected as the first service instance.

Design 2: The service providing apparatus may determine M to-be-selected service instances from the available service instances, and select, from the M to-be-selected service instances, a service instance that belongs to a smallest quantity of serving cells as the first service instance. M is an integer greater than 1. For example, the service providing apparatus may determine 10 service instances from 100 available service instances, and then select a service instance that belongs to a smallest quantity of serving cells, to add to a target serving cell.

Design 3: The service providing apparatus may select one to-be-selected service instance. If the to-be-selected service instance is not added to another service instance, the to-be-selected service instance is added to the target serving cell as the first service instance. If the to-be-selected service instance has been added to another serving cell, another to-be-selected service instance is selected, if the to-be-selected service instance has not been added to another service instance, the to-be-selected service instance is added to a target serving cell group as the first service instance, . . . , and the like. If a to-be-selected service instance selected at the fourth time has still been added to another serving cell, and for the to-be-selected service instance selected at the fourth time, if a quantity of serving cells to which the to-be-selected service instance is added is less than 2, the to-be-selected service instance is added to the target serving cell. For the to-be-selected service instance selected at the fourth time, if a quantity of to-be-selected serving cells is greater than 2, a to-be-selected service instance is reselected. If the service instance is not determined after the foregoing process is repeated three times, the quantity of the serving cells is increased to less than three, and the rest may be deduced by analogy.

Optionally, in the foregoing design 2 and/or design 3, the service providing apparatus may determine the to-be-selected service instance from the available service instances based on a selection algorithm. Optionally, the selection algorithm may include one or more of a hash algorithm, a random algorithm, and the like. Further, optionally, the selection algorithm may further include one or more parameters of an identifier of the target serving cell, a quantity of service instances included in the target serving cell, a quantity of available service instances, and the like. FIG. 5 is a schematic diagram of a possible method for determining a service instance according to an embodiment of this application. There are n available service instances, and the service instances are numbered from 0 to n. Therefore, it may be determined, based on a hash function, that a service instance number satisfies the following formula:

$$member1 = hash1(cell\ ID) \bmod n,$$

member1 is a service instance number; hash1( ) is a hash function for determining a to-be-selected service instance, and hash functions for determining different to-be-selected service instances are different; cell ID is an ID of a serving cell; and n is a quantity of available service instances. For example, if hash1(cell ID)mod n=2, a service instance 2 is used as the to-be-selected service instance. Further, the service instance 2 may be added to a target serving cell, or the service instance 2 is added to a target serving cell when the service instance 2 satisfies a condition.

Figure 6:
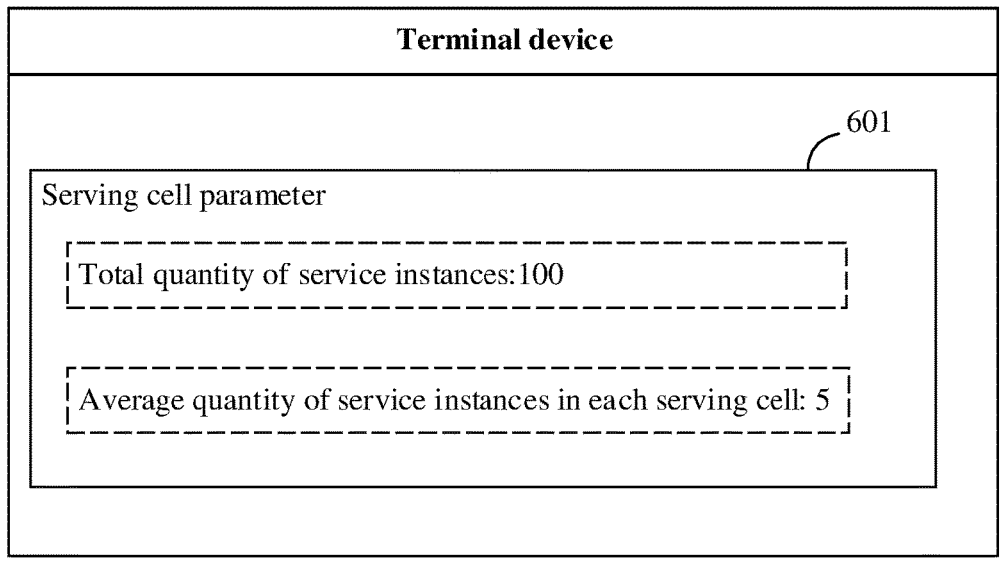
FIG. 6 is a schematic diagram of a page in a terminal device according to an embodiment of this application.

Optionally, the quantity of available service instances and the quantity of service instances included in the serving cell may be obtained based on user input. In a possible design, a user may input configuration data into a terminal apparatus. The configuration data may include one or more of the quantity of available service instances, the quantity of service instances included in the serving cell, and the like. The terminal apparatus may generate first indication information based on configuration information, and send the first indication information to the service providing apparatus. Correspondingly, the service providing apparatus may receive the first indication information sent by the terminal device, and determine corresponding configuration data based on the first indication information. For example, FIG. 6 is a schematic diagram of a page in a terminal device according to an embodiment of this application. A control shown in an area 601 may receive a quantity of available service instances and a quantity of service instances included in a serving cell that are input by a user. The terminal device may indicate, to a service providing apparatus by using first indication information, the quantity of available service instances and the quantity of service instances included in the serving cell.

The service providing apparatus adds a first service instance to a target serving cell, where the first service instance is for processing a first service request. Optionally, adding the first service instance may be specifically represented as adding a first service instance number and the like to information about the target serving cell. Alternatively, optionally, adding the first service instance may be represented as establishing a correspondence between the first service instance and the target serving cell.

Optionally, there are the following two possible implementations in which the service providing apparatus adds the first service instance to a target serving cell associated with a tenant.

Implementation 1: The service providing apparatus adds the first service instance in response to the first service request, where the first service instance is for processing the first service request. Optionally, if processing of the first service request is completed, the service providing apparatus may move the first service instance out of the target serving cell. Specifically, moving the target serving cell may be specifically updating the information about the target serving cell, deleting information about the first service instance from the information about the target serving cell, or the like.

Implementation 2: The service providing apparatus receives the first service request, and if the tenant is determined as a new tenant based on an identifier of the tenant, adds a service instance (where a newly added service instance includes the first service instance) to the target serving cell to process the first service request. Optionally, a subsequently received service request related to the tenant may be scheduled to a service instance in the target serving cell for processing.

Figure 7:
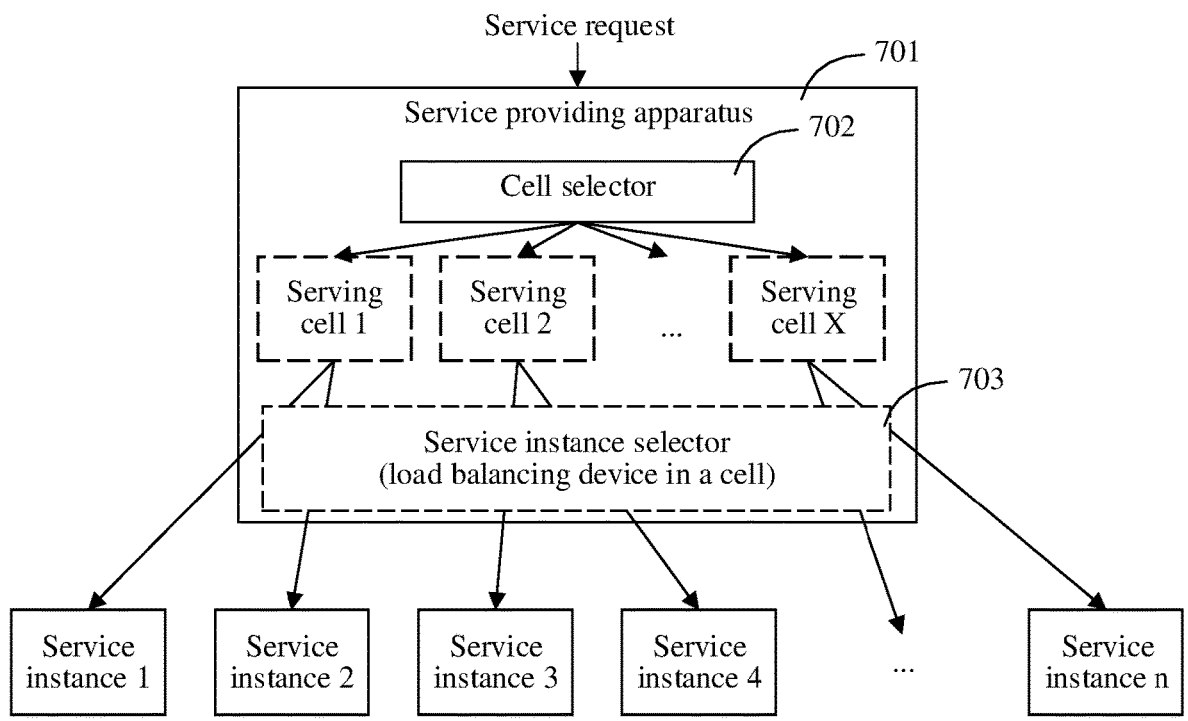
FIG. 7 is a schematic diagram of an architecture of another service system according to an embodiment of this application.

Optionally, the service providing apparatus may receive a second service request from the tenant. A second service instance is selected from a plurality of service instances in the target serving cell, and the second service instance is for processing the second service request. Further, optionally, the service providing apparatus may select the second service instance according to a load balancing principle. In a design, the foregoing service providing apparatus may be deployed in a load balancing device of a system, to reduce impact on a system architecture. For example, FIG. 7 is a schematic diagram of an architecture of another service system according to an embodiment of this application. A service providing apparatus 701 may include a cell selector (cell selector) 702 and a service instance selector 703. When a service request related to a tenant arrives, the cell selector 702 may select a serving cell associated with the tenant, and the service instance selector 703 may determine, according to a load balancing principle, a service instance for processing the service request.

Optionally, when service load of a target serving cell is less than a threshold, one or more service instances in the target serving cell may be moved out. Further, optionally, the threshold may be predefined or pre-configured, may be obtained based on indication information input by a user, or may be calculated based on an algorithm. For example, the target serving cell is associated with a tenant A. When a quantity of service requests of the tenant A decreases in a period of time, service load of the target serving cell also decreases accordingly. If the service load is less than a preset threshold, one or more service instances in the target serving cell are moved out based on setting of the system. In this way, a quantity of service instances in a serving cell may be dynamically controlled based on a change of service load, thereby improving utilization of service instances and improving user experience. Further, the moved service instance may be added to a serving cell with high service load, so that overall service processing efficiency of a system can be improved.

Figure 8:
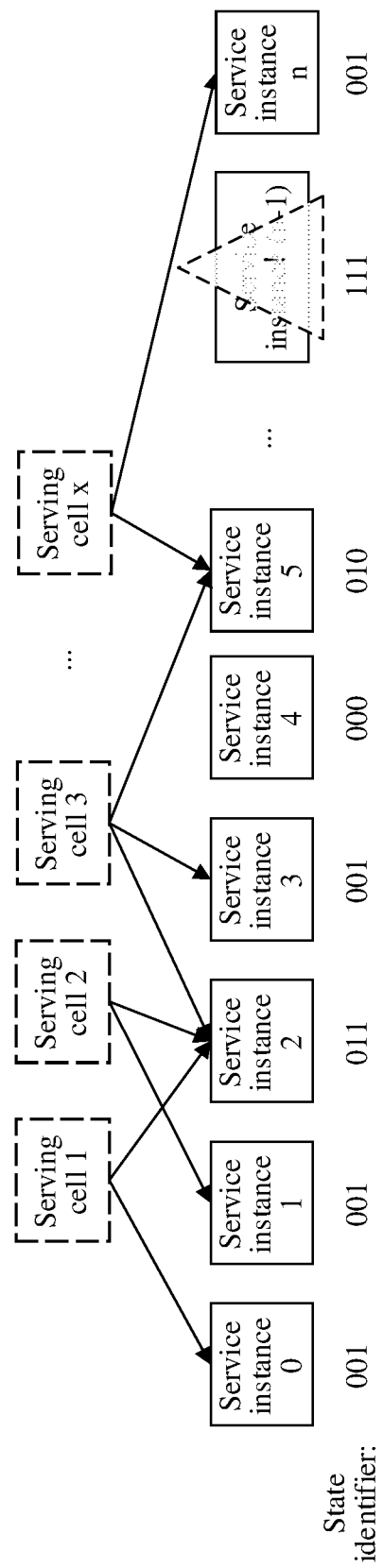
FIG. 8 is a schematic diagram of a state of a service instance according to an embodiment of this application.

Optionally, the service instance may correspond to a state identifier. The state identifier may represent a quantity of serving cells to which the service instance belongs, or may represent whether the service instance is abnormal. For example, a first service instance is used as an example. The first service instance may correspond to a state identifier, and the state identifier represents a quantity of serving cells to which the first service instance belongs or represents whether the first service instance is abnormal. For example, FIG. 8 is an example diagram of a possible service instance state according to an embodiment of this application. It can be seen that a three-bit binary number is used as a state identifier corresponding to a service instance. State identifiers 000 to 110 may represent a quantity of serving cells to which a service instance belongs, where 000 represents that the quantity of serving cells is 0, 001 represents that the quantity of serving cells is 1, and the rest may be deduced by analogy. A state identifier 111 may represent that a serving cell is in an abnormal state, for example, a state of a fault, breakdown, or temporary suspension. Certainly, in some implementations, more or fewer state identifiers may be used, or state identifiers of various types (for example, a number, a character, and fault code) may be used to correspond to different abnormal states. Examples are not cited one by one in this application. The state identifier is used to determine a current state of a service instance, to facilitate management of a plurality of service instances and improve service quality. For example, when a service instance added to a serving cell is selected, filtering may be performed more quickly, thereby improving efficiency.

Optionally, the foregoing target serving cell may belong to an availability zone (AZ). AZs are physically separated facilities. Optionally, different serving cells belong to different AZs, or different serving cells may belong to a same AZ. For example, the following three possible cases are cited in this application.

Case 1: Because different serving cells belong to different physical areas, if a physical fault (for example, a power failure or a cable damage) occurs on one serving cell, another serving cell may not be affected easily, thereby improving overall stability of a system.

Case 2: Different serving cells belong to different physical areas. When a fault occurs on one serving cell, the tenant may be associated with another serving cell. Because different serving cells belong to different AZs, in this case, a service request of the tenant may be handed over to another AZ for processing, thereby avoiding affecting service processing efficiency of the tenant and improving user experience.

Figure 9:
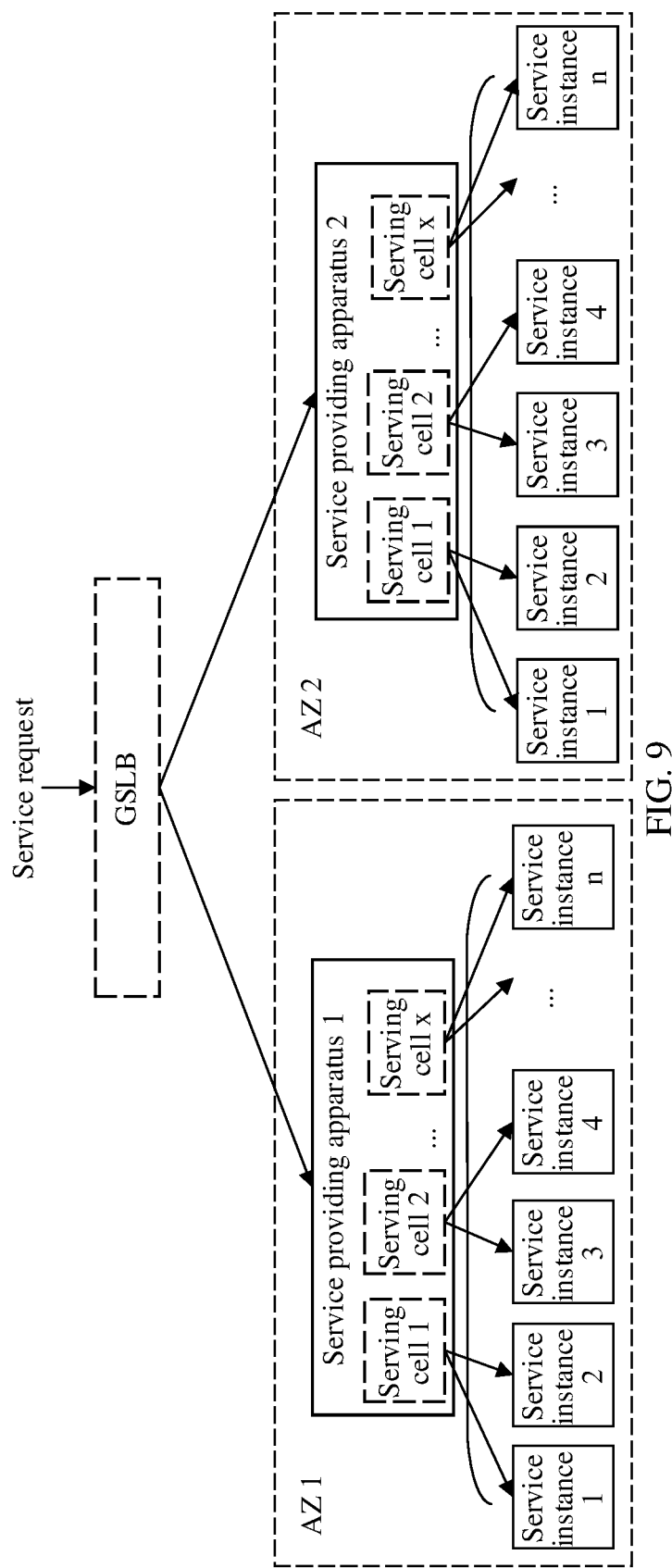
FIG. 9 is a schematic diagram of an architecture of still another service system according to an embodiment of this application.

Case 3: Different serving cells may alternatively belong to a same AZ. For example, FIG. 9 is a schematic diagram of a possible architecture of a service system according to an embodiment of this application. An AZ 1 and an AZ 2 each include a plurality of serving cells (or may be understood as two sets of serving cell instances), and configurations of serving cells of the AZ 1 and the AZ 2 may be the same, or may be different. When a fault occurs on the AZ 1, the request of the tenant may be allocated to the AZ 2, and a service providing apparatus 2 may schedule the service request to a service instance in a serving cell associated with the tenant for processing. Optionally, allocation of the request of the tenant may be implemented according to GSLB. The GSLB can sense that a physical fault domain or an AZ is unavailable, and schedule the service request of the tenant.

Optionally, different serving cells may belong to different fault domains. In this way, a fault occurred on one serving cell does not or does not easily cause a fault occurred on another serving cell, thereby reducing a fault radius, avoiding an explosive increase of faults, and improving system stability.

Optionally, a plurality of service instances in a serving cell may belong to a same AZ, or may belong to different AZs.

Optionally, a service providing apparatus may move a first service instance out of a target serving cell. Because the service instance in the serving cell changes dynamically, in cases in which current service load is low, first service processing is completed, or a system is scaled in, the service providing apparatus may move the first service instance out of the target serving cell. Optionally, the moved service instance may be subsequently added to another serving cell to perform other service processing, to improve flexibility and availability of the system.

In the embodiment shown in FIG. 3, the service providing apparatus may flexibly add a service instance based on a request of a tenant, thereby improving flexibility of a serving cell. Further, a service request of the tenant is allocated to a serving cell associated with the tenant for processing. If the service request of the tenant triggers a fault, a service instance in a serving cell that is not associated with the tenant is not affected, thereby reducing a fault radius and improving system stability. It may be understood that different tenants may be usually associated with different serving cells, to avoid that another serving cell is unavailable due to a fault caused by one tenant, thereby improving system availability.

It should be understood that, in this application, different tenants may be associated with different serving cells, or may be associated with a same serving cell. In a possible case, different tenants may be preferentially associated with different serving cells. In another possible case, serving cells associated with any two different tenants are different, but service instances in the serving cells may partially overlap.

In a possible design, because a service instance selected to be added is determined based on both a quantity of service instances and a size of a serving cell, there are a large quantity of combinations, and usually, different tenants may be associated with different serving cells. For example, if a quantity of available service instances is 100, and a quantity of service instances included in a serving cell is 5, there are 75287520 different serving cells theoretically. In this way, five service instances are randomly selected from the 100 service instances to form one serving cell. A probability that service instances of two serving cells are completely the same is 0.00000631, and a probability that the service instances of the two serving cells are completely different may reach 0.76959. It can be seen that, in this application, a blast radius can be effectively reduced, to avoid that another serving cell is unavailable due to a fault caused by one tenant, and effectively improve system stability.

The foregoing describes in detail the method in embodiments of this application. The following provides an apparatus in embodiments of this application.

Figure 10:
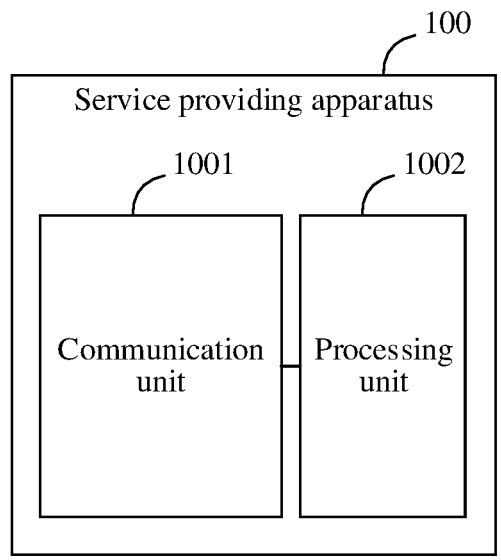
FIG. 10 is a schematic diagram of a service providing apparatus according to an embodiment of this application.

FIG. 10 is a schematic diagram of a structure of a service providing apparatus 100 according to an embodiment of this application. The service providing apparatus 100 may be the service providing apparatus in the embodiment shown in FIG. 3, or may be one module in the service providing apparatus, for example, a chip or an integrated circuit. The service providing apparatus 100 is configured to implement the foregoing service providing method, for example, the service providing method described in FIG. 3.

Further, the service providing apparatus 100 may include a communication unit 1001 and a processing unit 1002. Each unit is described in detail as follows.

The communication unit 1001 is configured to receive a first service request, where the first service request includes an identifier of a tenant.

The processing unit 1002 is configured to add a first service instance to a target serving cell associated with the tenant, where the first service instance is for processing the first service request.

In a possible implementation, the processing unit 1002 is further configured to: create the target serving cell for the first service request.

In another possible implementation, the processing unit 1002 is further configured to:
select, from a plurality of serving cells, one serving cell as the target serving cell.

In another possible implementation, the processing unit 1002 is further configured to:
select, from a plurality of serving cells, one serving cell that is not associated with another tenant as the target serving cell.

In another possible implementation, the communication unit 1001 is further configured to receive a second service request, and the second service request includes the identifier of the tenant.

The processing unit is further configured to select a second service instance from a plurality of service instances in the target serving cell according to a load balancing principle, where the second service instance is for processing the second service request.

In another possible implementation, the processing unit 1002 is further configured to:
move the first service instance out of the target serving cell.

In another possible implementation, the processing unit 1002 is further configured to: when service load of the target serving cell is less than a threshold, move one or more service instances out of the target serving cell.

In another possible implementation, the target serving cell belongs to an availability zone AZ.

In another possible implementation, different serving cells belong to different AZs, or different serving cells belong to a same AZ.

In another possible implementation, different serving cells belong to different fault domains.

In another possible implementation, the first service instance corresponds to a state identifier, and the state identifier represents a quantity of serving cells to which the first service instance belongs or represents whether the first service instance is abnormal.

In another possible implementation, the processing unit 1002 is further configured to:
preferentially select, from available service instances, a service instance that is not added to another serving cell as the first service instance; or
preferentially select, from available service instances, a service instance that belongs to a small quantity of serving cells as the first service instance.

In another possible implementation, the processing unit 1002 is further configured to:
determine M to-be-selected service instances from available service instances, where M is an integer greater than 1; and
determine the first service instance from the M to-be-selected service instances, where the first service instance is a service instance that is in the N to-be-selected service instances and that belongs to a smallest quantity of serving cells.

In another possible implementation, the processing unit 1002 is further configured to:
determine a to-be-selected service instance from available service instances based on a selection algorithm.

Optionally, the selection algorithm may include one or more of a hash algorithm, a random algorithm, and the like. Further, optionally, the selection algorithm may further include one or more parameters of an identifier of a first serving cell, a quantity of service instances included in the first serving cell, a quantity of available service instances, and the like.

In another possible implementation, the communication unit 1001 is further configured to receive first indication information sent by a terminal device, and the first indication information is obtained based on user input.

The processing unit 1002 is further configured to determine, based on the first indication information, a quantity of available service instances or a quantity of service instances included in the first serving cell.

It may be understood that in the apparatus embodiments of this application, division of the plurality of units or modules is merely logical division performed based on functions, and is not intended to limit a specific structure of the apparatus. In specific implementation, some function modules may be subdivided into more small function modules, and some function modules may be combined into one function module. However, regardless of whether these function modules are subdivided or combined, a general procedure executed by the apparatus in a service providing process is the same. Usually, each unit has corresponding program code (or program instructions). When the program code corresponding to each unit is run on a processor, the unit is controlled by the processor to execute a corresponding procedure, to implement a corresponding function.

An embodiment of this application further provides a terminal apparatus. The terminal apparatus may include an input unit, a processing unit, and a communication unit. Each unit is described in detail as follows.

An input unit is configured to receive a quantity of available service instances or a quantity of service instances included in a first serving cell that is output by a user.

A processing unit is configured to obtain first indication information based on the quantity of available service instances or the quantity of service instances included in the first serving cell.

A communication unit is configured to send the first indication information to a service providing apparatus.

Figure 11:
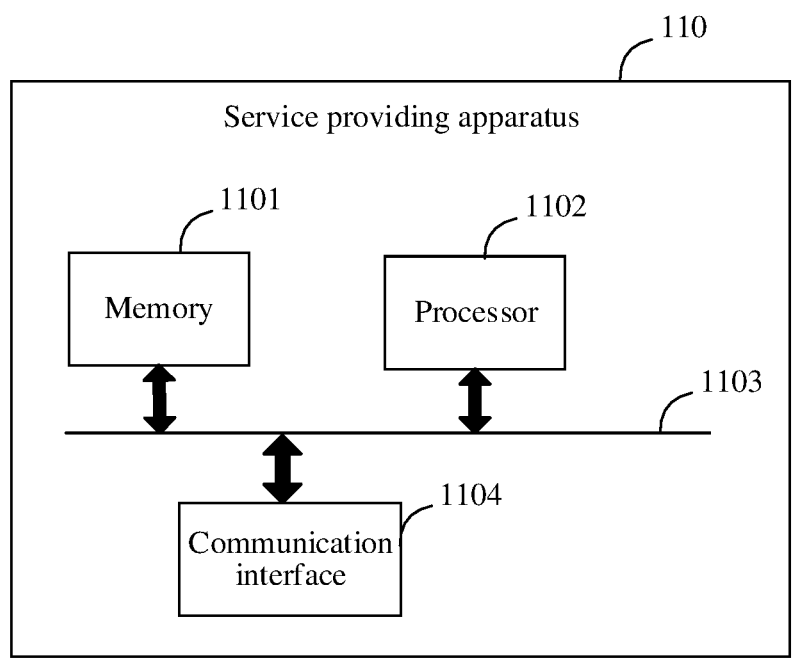
FIG. 11 is a schematic diagram of another service providing apparatus according to an embodiment of this application.

FIG. 11 is a schematic diagram of a structure of service providing apparatus 110 according to an embodiment of this application. The service providing apparatus 110 may include at least one memory 1101, at least one processor 1102, and a communication interface 1104. Optionally, a bus 1103 may be further included. The memory 1101, the processor 1102, and the communication interface 1104 are connected through the bus 1103.

The memory 1101 is configured to provide storage space, and the storage space may store data such as an operating system and computer instructions. The memory 1101 may be one or a combination of a random access memory (RAM), a read-only memory (ROM), an erasable programmable read-only memory (EPROM), a compact disc read-only memory (CD-ROM), or the like.

The processor 1102 is a module for performing an arithmetic operation and/or a logical operation, and may be specifically one or a combination of service instances such as a central processing unit (CPU), a graphics processor (GPU), a microprocessor unit (MPU), an application-specific integrated circuit (ASIC), a field programmable logic gate array (FPGA), and a complex programmable logic device (CPLD).

The communication interface 1104 may be configured to provide information input or output for the at least one processor; and/or the communication interface 1104 may be configured to receive data sent externally and/or send data to the outside, and may be a wired link interface including an Ethernet cable and the like, or may be a wireless link (such as Wi-Fi, Bluetooth, universal wireless transmission, an in-vehicle short-distance communication technology, and another short-distance wireless communication technology) interface. Optionally, the communication interface 1104 may further include a transmitter (for example, a radio frequency transmitter or an antenna) coupled to the interface, a receiver, or the like.

For example, the communication interface 1104 may further include an antenna. An electromagnetic wave is received through the antenna. The communication interface 1104 may further perform frequency modulation and filtering processing on a signal of the electromagnetic wave, and send a processed signal to the processor 1102. For another example, the communication interface 1104 may further receive a to-be-sent signal from the processor 1102, perform frequency modulation and amplification on the to-be-sent signal, and convert the to-be-sent signal into an electromagnetic wave through the antenna and radiate the electromagnetic wave.

The processor 1102 in the service providing apparatus 110 is configured to read the computer instructions stored in the memory 1101, to perform the foregoing service providing method, for example, the service providing method described in the embodiment shown in FIG. 3.

For example, the processor 1102 in the service providing apparatus 110 is configured to read the computer instructions stored in the memory 1101, to perform the following operations:

receiving a first service request through the communication interface 1104, where the first service request includes an identifier of a tenant; and adding a first service instance to a target serving cell associated with the tenant, where the first service instance is for processing the first service request.

In a possible implementation, the processor 1102 is further configured to:

create the target serving cell for the first service request.

In another possible implementation, the processor 1102 is further configured to:

select, from a plurality of serving cells, one serving cell as the target serving cell.

In another possible implementation, the processor 1102 is further configured to:

select, from a plurality of serving cells, one serving cell that is not associated with another tenant as the target serving cell.

In another possible implementation, the processor 1102 is further configured to:

receive a second service request through the communication interface 1104, where the second service request includes the identifier of the tenant; and select a second service instance from a plurality of service instances in the target serving cell according to a load balancing principle, where the second service instance is for processing the second service request.

In another possible implementation, the processor 1102 is further configured to:

move the first service instance out of the target serving cell.

In another possible implementation, the processor 1102 is further configured to: when service load of the target serving cell is less than a threshold, move one or more service instances out of the target serving cell.

In another possible implementation, the target serving cell belongs to an availability zone AZ.

In another possible implementation, different serving cells belong to different AZs, or different serving cells belong to a same AZ.

In another possible implementation, different serving cells belong to different fault domains.

In another possible implementation, the first service instance corresponds to a state identifier, and the state identifier represents a quantity of serving cells to which the first service instance belongs or represents whether the first service instance is abnormal.

In another possible implementation, the processor 1102 is further configured to:
preferentially select, from available service instances, a service instance that is not added to another serving cell as the first service instance; or
preferentially select, from available service instances, a service instance that belongs to a small quantity of serving cells as the first service instance.

In another possible implementation, the processor 1102 is further configured to:
determine M to-be-selected service instances from available service instances, where M is an integer greater than 1; and
determine the first service instance from the M to-be-selected service instances, where the first service instance is a service instance that is in the N to-be-selected service instances and that belongs to a smallest quantity of serving cells.

In another possible implementation, the processor 1102 is further configured to:
determine a to-be-selected service instance from available service instances based on a selection algorithm.

Optionally, the selection algorithm may include one or more of a hash algorithm, a random algorithm, and the like. Further, optionally, the selection algorithm may further include one or more parameters of an identifier of a first serving cell, a quantity of service instances included in the first serving cell, a quantity of available service instances, and the like.

In another possible implementation, the processor 1102 is further configured to:
receive, through the communication interface 1104, first indication information sent by a terminal device, where the first indication information is obtained based on user input; and
determine, based on the first indication information, a quantity of available service instances or a quantity of service instances included in the first serving cell.

An embodiment of this application further provides a terminal device, including a processor and a memory. The processor is configured to execute computer instructions stored in the memory, to perform the following operations:
receiving a quantity of available service instances or a quantity of service instances included in a first serving cell that is output by a user;
obtaining first indication information based on the quantity of available service instances or the quantity of service instances included in the first serving cell; and
sending the first indication information to a service providing apparatus.

An embodiment of this application further provides a computer-readable storage medium. The computer-readable storage medium stores computer instructions. When the computer instructions are run on one or more processors, the service providing method described in the embodiment shown in FIG. 3 is implemented.

An embodiment of this application further provides a chip system. The chip system includes at least one processor, a memory, and an interface circuit. The interface circuit is configured to provide information input/output for the at least one processor. The at least one memory stores computer instructions. When the computer instructions are run on one or more processors, the service providing method described in the embodiment shown in FIG. 3 is implemented.

An embodiment of this application further provides a computer program product. When the computer program product is run on one or more processors, the service providing method described in the embodiment shown in FIG. 3 is implemented.

It should be noted that, unless otherwise specified, terms such as "first" and "second" in this application are used to distinguish between same items or similar items having basically the same actions and functions. It should be understood that "first", "second", and "n" do not have a logical or time sequence dependency relationship, and do not limit a quantity and an execution sequence. It should also be understood that although the following description uses terms such as first and second to describe various elements, these elements should not be limited by the terms. These terms are merely used to distinguish one element from another. For example, first information and second information are merely used to describe a plurality of pieces of information, but does not indicate differences in content, importance, and the like of the two types of information. Both the first information and the second information may be information, and in some cases, may be separate and different indicators.

"One embodiment", "an embodiment", and "a possible implementation" mentioned in this application indicate that a particular feature, structure, or characteristic related to the embodiment or the implementation is included in at least one embodiment of this application. Therefore, "in an embodiment", "in an embodiment", or "a possible implementation" that appears throughout the specification does not necessarily refer to a same embodiment. In addition, these particular features, structures, or characteristics may be combined in one or more embodiments in any suitable manner.

In this application, the term such as "example" or "for example" is used to represent giving an example, an illustration, or a description. Any embodiment or design solution described as "example" or "for example" in this application should not be explained as being more preferred or having more advantages than another embodiment or design solution. Exactly, use of the word "example", "for example", or the like is intended to present a related concept in a specific manner.

The terms such as "component", "module", and "system" used in this application are used to indicate a computer-related entity: hardware, firmware, a combination of hardware and software, software, or software being executed. For example, a component may be, but is not limited to, a process that runs on a processor, a processor, an object, an executable file, a thread of execution, a program, and/or a computer. As shown in figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate through a local and/or remote process and based on a signal having one or more data packets (for example, data from two components interacting with another component in a local system, a distributed system, and/or across a network, or the internet interacting with another system through a signal).

In this application, "at least one" means one or more, and "a plurality of" means two or more. At least one of the following items (pieces) or a similar expression thereof refers to any combination of these items, including any combination of singular items (pieces) or plural items (pieces). For example, at least one of a, b, or c may represent: a, b, c, (a and b), (a and c), (b and c), or (a and b and c), where a, b, and c may be singular, or may be plural.

In this application, "and/or" is used to describe an association relationship between associated objects and represents that three relationships may exist. For example, A and/or B may represent the following three cases: Only A exists, both A and B exist, and only B exists, where A and B may be singular or plural. A character "/" generally indicates an "or" relationship between the associated objects.

It should further be understood that the term "include" (also referred to as "includes", "including", "comprises", and/or "comprising") used in this specification specifies presence of the stated features, integers, steps, operations, elements, and/or components, with presence or addition of one or more other features, integers, steps, operations, elements, components, and/or their components not excluded.

What is claimed is:

1. A service providing method performed by a service providing apparatus in a service network, comprising:
   receiving a first service request from a tenant in the service network, wherein the first service request comprises an identifier of the tenant;
   generating a cell identifier based on the identifier of the tenant;
   creating a target serving cell associated with the cell identifier in response to the first service request;
   determining M to-be-selected service instances from available service instances, wherein M is an integer greater than 1, wherein the M to-be-selected service instances are identified by different instance numbers derived by applying different hash functions to the cell identifier;
   selecting a plurality of service instances from the M to-be-selected service instances for inclusion in the target service cell; and
   selecting a first service instance from the plurality of service instances in the target serving cell for processing the first service request.

2. The method according to claim 1, further comprising:
   receiving a second service request, wherein the second service request comprises the identifier of the tenant; and
   selecting a second service instance from the plurality of service instances in the target serving cell according to a load balancing principle, wherein the second service instance is for processing the second service request.

3. The method according to claim 1, further comprising: moving the first service instance out of the target serving cell.

4. The method according to claim 1, further comprising: when a service load of the target serving cell is less than a threshold, moving one or more service instances out of the target serving cell.

5. The method according to claim 1, wherein the target serving cell belongs to an availability zone.

6. The method according to claim 1, wherein different serving cells belong to different fault domains.

7. The method according to claim 1, wherein the first service instance corresponds to a state identifier, and the state identifier represents a quantity of serving cells to which the first service instance belongs or represents whether the first service instance is abnormal.

8. The method according to claim 1, wherein the step of generating the cell identifier derives the cell identifier by applying a Base64( ) function to the identifier of the tenant.

9. A service providing apparatus in a service providing network, comprising:
   a memory storing executable instructions; and
   a processor configured to execute the executable instructions to:
   receive a first service request from a tenant in the service providing network, wherein the first service request comprises an identifier of the tenant;
   generate a cell identifier based on the identifier of the tenant;
   creating a target serving cell associated with the cell identifier in response to the first service request;
   determining M to-be-selected service instances from available service instances, wherein M is an integer greater than 1, wherein the M to-be-selected service instances are identified by different instance numbers derived by applying different hash functions to the cell identifier;
   selecting a plurality of service instances from the M to-be-selected service instances for inclusion in the target service cell; and
   selecting a first service instance from the plurality of service instances in the target serving cell for processing the first service request.

10. The service providing apparatus according to claim 9, wherein the processor is further configured to:
    receive a second service request, wherein the second service request comprises the identifier of the tenant; and
    select a second service instance from the plurality of service instances in the target serving cell according to a load balancing principle, wherein the second service instance is for processing the second service request.

11. The service providing apparatus according to claim 9, wherein the processor is further configured to:
    move the first service instance out of the target serving cell.

12. The service providing apparatus according to claim 9, wherein the processor is further configured to:
    when service load of the target serving cell is less than a threshold, move one or more service instances out of the target serving cell.

13. The service providing apparatus according to claim 9, wherein the target serving cell belongs to an availability zone.

14. The service providing apparatus according to claim 9, wherein the processor is configured to generate the cell identifier by applying a Base64( ) function to the identifier of the tenant.

* * * * *